Oct. 18, 1938.                E. R. CANFIELD                2,133,536
                    FRONT WHEEL DRIVE FOR MOTOR VEHICLES
                    Filed Feb. 13, 1937        3 Sheets-Sheet 1

INVENTOR.
EDWARD R. CANFIELD
BY
U. G. Charles
ATTORNEY.

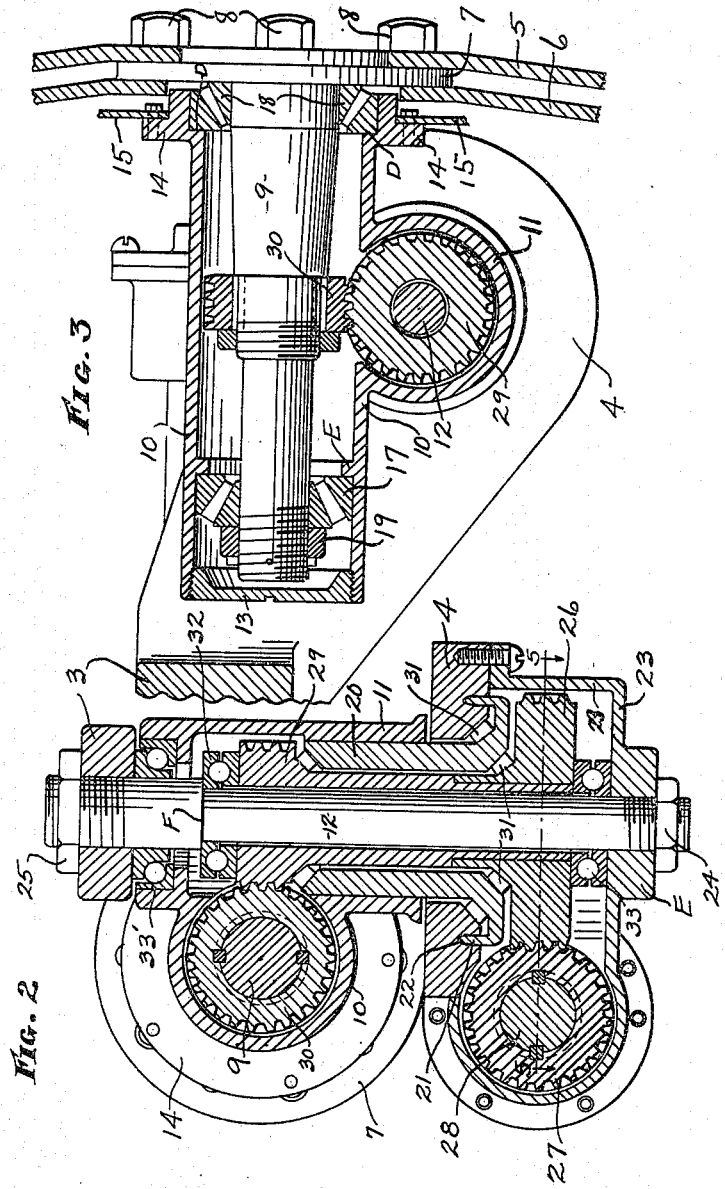

Oct. 18, 1938.   E. R. CANFIELD   2,133,536
FRONT WHEEL DRIVE FOR MOTOR VEHICLES
Filed Feb. 13, 1937   3 Sheets-Sheet 3
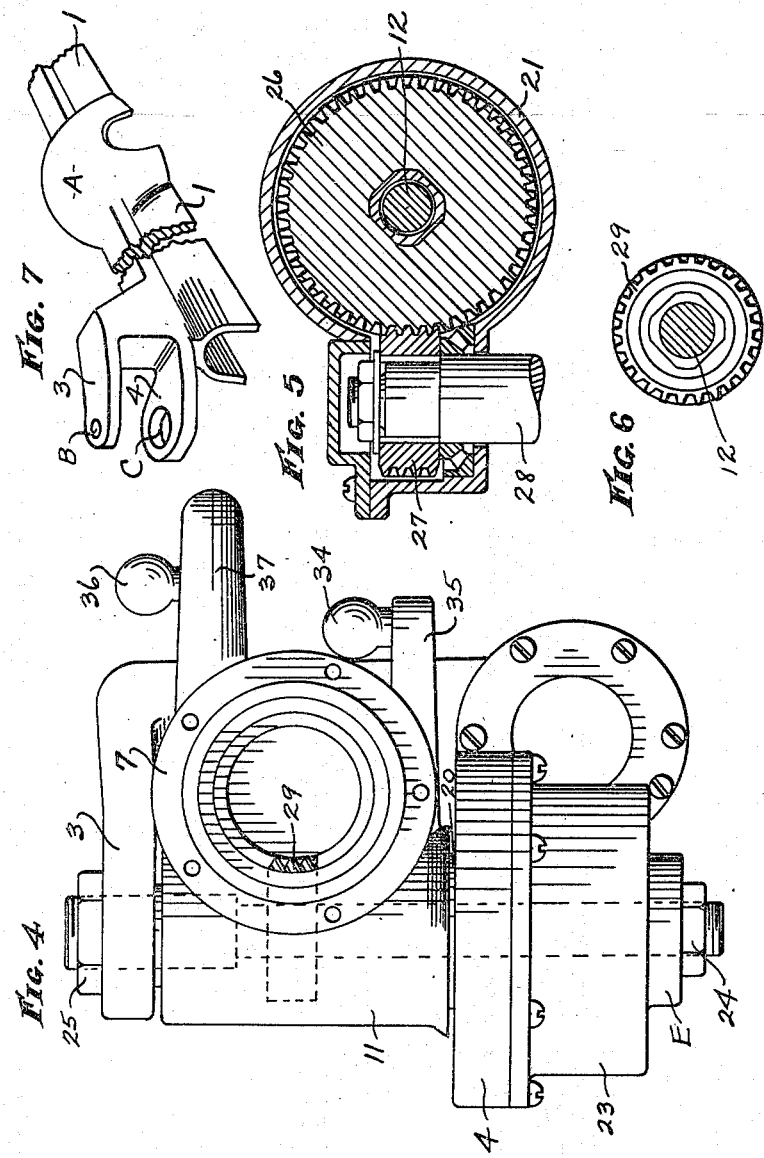
INVENTOR.
EDWARD R. CANFIELD
BY
ATTORNEY.

Patented Oct. 18, 1938

2,133,536

UNITED STATES PATENT OFFICE 2,133,536

FRONT WHEEL DRIVE FOR MOTOR VEHICLES

Edward R. Canfield, Goodman, Mo.

Application February 13, 1937, Serial No. 125,551

2 Claims. (Cl. 180—48)

The object of my invention is to convey a motor driven vehicle through the medium of its front wheels that are actuated by a series of spiral gears hereinafter described.

A further object of my invention is to provide a pivot connection for the wheel through the medium of a king-pin to the axle approximately on a plane with the center zone of the wheel tire, and furthermore, the said king-pin slanting across the plane of the said center zone.

A still further object of my invention is to provide an efficient oiling means for the gear arrangement by close engaging housing, following in general the contour of the gears and spindle, the spindle secured to the wheel hub and rotatable therewith.

A still further object of my invention is to secure the king-pin rigid to the axle housing yoke and rotatably mounted thereon, the gears transmitting torque from the driven axle to the wheel spindle as turning means for the wheel, and the said wheel free to rock reciprocatingly on said king-pin as steering means for the vehicle. These and other objects will hereinafter be more fully explained, reference being had to the accompanying drawings in which like characters will apply to like parts in the different views.

Referring to the drawings:

Fig. 2 is a sectional view taken on line 2—2 in Fig. 1, the king-pin being in elevation.

Fig. 3 is a sectional view taken on line 3—3 in Fig. 1, looking in direction of arrows.

Fig. 4 is an outer end view of the gear housing and inner bearing spindle, the wheel being removed for convenience of illustration.

Fig. 5 is a sectional view taken on line 5—5 in Fig. 2.

Fig. 6 is a side view of the gear on the upper end of the king-pin showing the end of the hub as formed.

Fig. 7 is a fragmentary perspective view of the axle housing and its yoke.

Figure 1:
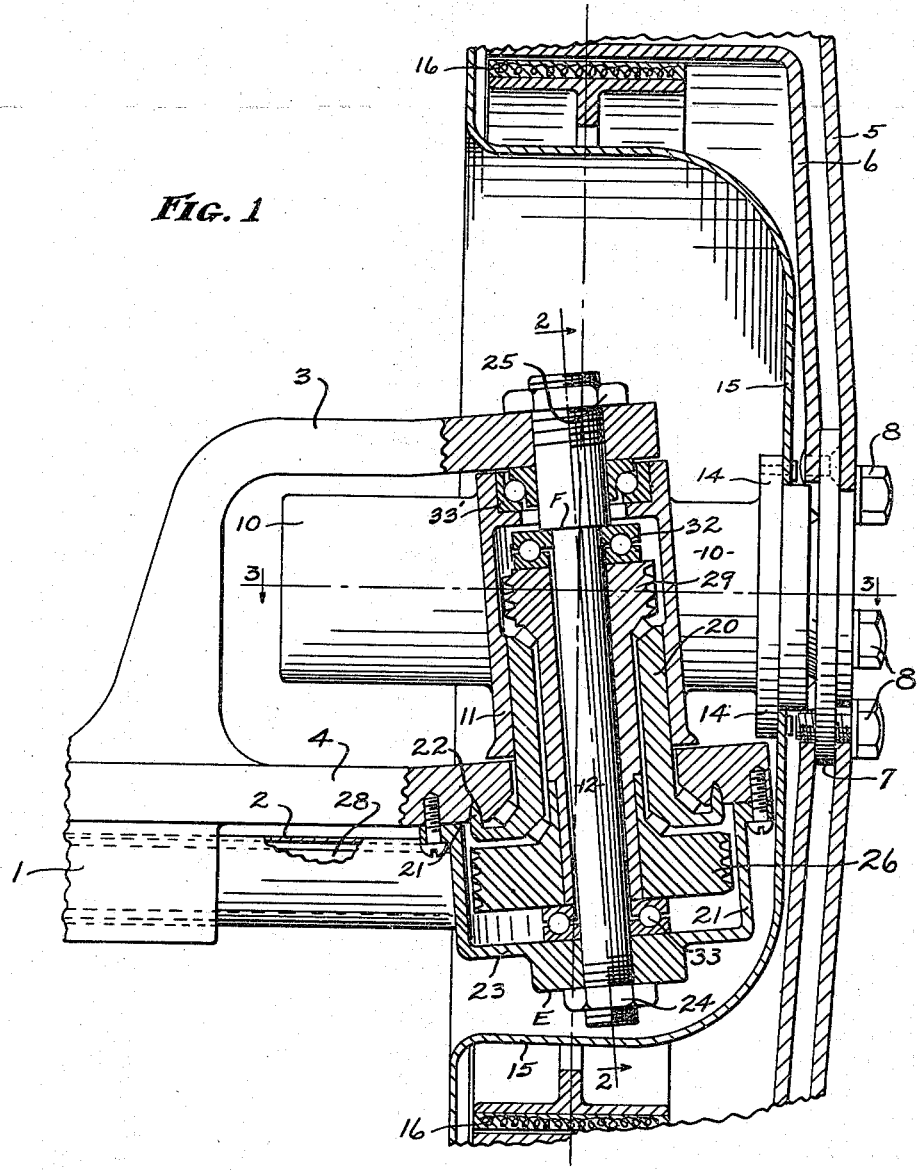
Fig. 1 is a side view of the yoke, gear arms, wheel spindle housings and sectional view through the king-pin housing and gears mounted thereon, also sectional view of the wheel hub and brake drum.

My invention herein disclosed relates to a front wheel drive for motor driven vehicles, the mechanism of which consists of an auxiliary housing 1, U-shaped in cross section, and secured to the front axle housing 2 by U bolt means that clamps the front springs to said housings, springs and clamps not shown in the drawings. Each outer end of the auxiliary housing has a yoke comprising an upper arm 3 and a lower arm 4, each of which are integrally joined to said U-shaped housing. At the longitudinal center of said housing is an enlargement A, to conform to a differential enlargement on housing 2, the differential being operated by a forwardly extending drive shaft, the two latter named elements not shown in the drawings, but may be of conventional type.

The outer ends of the yoke arms are turned upward, and are apertured as at B and C, respectively, the axial alignment of which is to position a king-pin carried thereby slantingly with respect to a vertical plane.

In Fig. 1 is shown the hub portion of the vehicle wheel, consisting of a plate 5, and head of a brake drum 6, said members spaced apart by a disc 7, and being secured together by cap screws 8, said members being secured to a spindle 9 that is positioned in a tubular housing 10, the housing being integrally joined to a grease container 11. Said housing 10 and container 11 are adapted to rock with the wheel for steering purpose. At the axis upon which said wheel will rock is a king-pin 12, centrally positioned with respect to the wheel, but obliquely crossing the plane of its center zone. The said housing 10 has a head 13, threadedly engaging in the outer end as accessible means to the spindle. The housing has an outwardly extending annular flange 14, to which a shield 15 is secured; said shield functions as an inclosure for a break band 16, and the said shield, being concaved, will permit the position of the pivot point upon which the wheel will rock, as above described.

The said spindle 9, axially extending into its respective housing, is mounted in nonfriction bearings 17 and 18, oppositely disposed to avoid longitudinal movement of the spindle, said bearings seating against a shoulder D, and an annular inner extending stop E, respectively. To adjust the said bearings, I have placed on the outer end of the spindle a nut 19, threadedly engaging thereon to release or take up the slack in the bearings, it being understood that disengagement of the said nut will free the spindle for its removal from the housing and bearings associated therewith. The king-pin housing constitutes a grease container, consisting of an upper member 11 previously referred to and a lower member 20, said members threadedly engaging. The lower end of member 20 has an upturned flange 21 to engage in an annular groove, positioned on the under side of arm 4, in which a packing element is placed as fluid tight means as the member 20 is rockable with member 11, turning in aperture C of yoke arm 4.

Secured to the under side of arm 4 is a cap 23, functioning as an inclosure for the lower end of the said grease container, and also as a housing for a spiral gear, later described. The said cap has a hub E, concentrically positioned on the head thereof and being apertured to receive the end of the said king-pin, while the other end of the pin extends through aperture B in arm 3 of the yoke. Each end of said king-pin extends outward as shown to be engaged by nuts 24 and 25 as rigid securing means for the pin to the yoke. The king-pin 12 passes through the grease container and lower gear housing as shown in Figs. 1 and 2, and a lower spiral gear 26 is mounted on the king-pin and in mesh with the spiral gear 27 secured to the drive axle 28. An upper spiral gear 29 is mounted upon the king-pin, and meshes with the spiral gear 30 on the said revolving spindle 9. The lower and upper spiral gears have hubs secured thereto which surround the king-pin within the grease container, and being engaged in such a manner as to enable the upper gear 29 to be driven by the lower gear 26. Bearings 31 are located between the grease container and the upper and lower gears.

A bearing 32 is located between a shoulder F on the king-pin and the upper gear, and a bearing 33 is located between the cap and the lower gear, and a bearing 33' between housing 11 and arm 3.

The housing of the grease container through which the king-pin passes, and the housing in which the revolving spindle is journaled, are offset with relation to each other so as to position the revolving spindle on a horizontal plane above, and in parallelism with the drive axle.

The housings inclosing other parts of the mechanism are joined by a connecting rod engaging with a knuckle 34, secured to an arm 35 that integrally joins the housing, by which means the said housings with their respective wheels are rocked in the same direction simultaneously through the medium of a conventional steering rod connected to knuckle 36, that is joined to its respective arm 37, said arm likewise integrally joined to one of said housings.

While I have shown and described a mechanism for a front wheel drive, the same may be modified and applied to a rear wheel drive, and I do not wish to be restricted to the exact members set out in the wheel hub structure aside from the concavity required for a centrally disposed king-pin for the wheel, and such other modification may be made as lie within the scope of the appended claims.

Having fully described my invention, what I claim as new and desire to secure by Letters Patent is:

1. In a front wheel drive for motor vehicles, an axle housing, an auxiliary housing pivotally associated therewith by means of a king-pin, a wheel having rigid therewith a spindle, the spindle being rotatably mounted in the auxiliary housing and the king-pin being disposed centrally in the wheel, a drive shaft mounted in the axle housing, and a series of spiral gears drivingly connecting the drive shaft to the spindle, said gears comprising two gears journalled on the king-pin and having elongated hubs telescopically engaged and secured together against relative rotation, one of said two gears being driven by the drive shaft and the other driving the spindle.

2. In a front wheel drive for motor vehicles, an axle housing, an auxiliary housing mounted on the axle housing, a gear and spindle housing pivotally associated therewith by means of a king-pin, a spindle having a wheel rigid therewith, the spindle being rotatably mounted in the spindle housing, and the king-pin being disposed centrally in the wheel, a drive shaft mounted in the axle housing, and a series of spiral gears connecting the drive shaft to the spindle as driving means therefor, two of said gears journalled on the king-pin and having elongated hubs telescopically engaging and secured together for a simultaneous rotation in the same direction, one of the said two gears being driven by the drive shaft and the other driving the spindle.

EDWARD R. CANFIELD.